United States Patent [19]

Patel et al.

[11] Patent Number: 4,903,263
[45] Date of Patent: Feb. 20, 1990

[54] APPARATUS AND METHOD FOR PROVIDING EXISTING TELEPHONE SWITCHING EQUIPMENT WITH INTEGRATED SERVICES DIGITAL NETWORK CAPABILITY

[75] Inventors: Rajendra Patel, Richardson; Girish Patel, both of Plano, Tex.

[73] Assignee: Network Access Corporation, Richardson, Tex.

[21] Appl. No.: 252,539

[22] Filed: Oct. 3, 1988

[51] Int. Cl.⁴ .................... H04J 3/02; H04Q 11/04
[52] U.S. Cl. .................................. 370/110.1; 370/60
[58] Field of Search ................ 370/60, 94, 110.1, 58

[56] References Cited

U.S. PATENT DOCUMENTS 4,589,106 5/1986 Prather et al. ................. 370/60
4,730,312 3/1988 Johnson et al. ............. 370/110.1
4,761,779 8/1988 Nara et al. ..................... 370/60
4,789,981 12/1988 Yanosy, Jr. et al. ......... 370/110.1

Primary Examiner—Douglas W. Olms
Assistant Examiner—Min Jung
Attorney, Agent, or Firm—Harold E. Meier

[57] ABSTRACT

The invention relates to upgrading existing telephone central offices which utilize electromechanical or electronic switching equipment to include the capability of processing calls in the ISDN protocol. In particular, it relates to providing said switching equipment with the capability of controlling the connection, management, and disconnection of telephone circuits using Integrated Services Digital Network (ISDN), a national and international standard set of protocols for providing such circuit control and providing and receiving information via the ISDN protocol for enabling enhanced service in the switching equipment.

7 Claims, 2 Drawing Sheets

APPARATUS AND METHOD FOR PROVIDING EXISTING TELEPHONE SWITCHING EQUIPMENT WITH INTEGRATED SERVICES DIGITAL NETWORK CAPABILITY

FIELD OF THE INVENTION

The invention relates to telephone switching offices which utilize electromechanical or electronic switching equipment. In particular, the invention relates to a method and apparatus for providing the switching equipment with the capability of controlling the connection, management, utilization for information transfer, and disconnection of telephone circuits for telephone sets, terminals, and other devices that access the switching equipment by means of Integrated Services Digital Network (ISDN) interface protocols, a national and international standard set of protocols for providing such circuit control, and providing and receiving information via the ISDN protocols for enabling enhanced value-added services in the switching equipment.

BACKGROUND OF THE INVENTION

The existing telephone network in the United States of America is largely a remnant of the earlier AT & T Network which was divested into several regional holding companies pursuant to an order of a Federal Court. This existing network had been designed to provide the equivalent of an electrical connection between two points in the network. The only information originating within the telephone network, and the conveyance of this information, was related to the provision of a basic capability to connect the two points.

Advances in the state of the art of communications have lead to the possibility of providing the existing services of the telephone network in a more efficient manner while simultaneously establishing the foundation for new network services beyond the capability of the existing network. The realization of this possibility has resulted in both national and international development of new standards for communication protocols between the switching elements within the telephone network. These new standards are widely referred to as "Signaling System #7 (SS7)". For example, see TR-NPL-000246 "Bell Communications Research Specification of Signaling System No. 7, Revision #2, 6/87."

These new services not only require common channel signaling on an inter-office basis, but have made apparent the requirement for common channel signaling to the end user customer or subscriber.

Common channel signaling uses a single dedicated control channel for all signaling functions related to a group of associated channels. The (pre-divestiture) U.S. Bell System installed its first common channel signaling facilities in 1976. A. E. Ritchie and J. Z. Menard, "Common Channel Interoffice Signaling, An Overview", Bell System Technical Journal, February 1978, pp. 221-236. These facilities are referred to as Common Channel Interoffice Signaling (CCIS) facilities.

The extant method of signaling from a terminal to the telephone central office switch to request service (e.g., circuit connection, operator service request, or circuit disconnection) or between central office and private branch exchange switches, is based upon in-band signaling techniques. Such systems transmit the signaling information in the same band of frequencies as that used by the voice or data signal. Frequently, existing data terminals use converters called modems (modulators/demodulators) to convert the data terminal signals into corresponding voice-frequency band signals. The most prevalent example of in-band signaling is single frequency (SF) signaling, which uses a 2600 Hertz tone as an on-hook (call termination) signal for inter-office trunks.

Two common examples of in-band signaling are those of push-button telephones which use dual-tone multifrequency (DTMF) signaling, and multifrequency (MF) signaling between switching offices.

As the majority of telephones in the United States of America are connected to crossbar offices, 1ESS (a Trademark of AT&T Technologies, Inc.) or 1/1AESS (a Trademark of AT&T Technologies, Inc.) switches, the replacement or upgrading of these switches would require vast economic expenditures by the telephone companies. Estimates of this replacement cost for a typical central offices are frequently in excess of $3 million. The incurring of such costs for the replacement of switching equipment which is functioning well is not justified by initial increases in revenues from the provision of more efficient switching.

The present invention provides a method and apparatus for implementing ISDN capabilities within Class 5 central offices such as the 1/1A ESS (a Trademark of AT&T Technologies, Inc.) analog SPC office. This is accomplished without affecting the underlying operating principles of the existing switching office. In addition, the ISDN capability is provided in a cost effective manner without adversely affecting the quality of service as perceived by the subscribers connected to such a switching office. Further, the ISDN capability is provided in such a manner so as not to adversely affect the operation of the upgraded switching office or the rest of the telephone system.

The Integrated Services Digital Network is an end-to-end digital network that supports a wide range of services accessed by a limited set of standard multi-purpose user-network digital interfaces.

ISDN provides a small number of standard interfaces, for example, the Basic Rate Interface (BRI) and the Primary Rate Interface (PRI), for high-speed digital voice and data services access, through a single interface to the user's premises. In particular, an ISDN access interface incorporates a common signaling channel to the end user, thereby extending the inter-office SS7 capability to the end user.

A number of ISDN trials have been taking place in Bell and independent telephone operating company networks, and limited commercial deployment of ISDN has begun in some metro areas. One of the main reasons for the slow progress of ISDN to date in the U.S. is the installed base of 1/1A ESS analog SPC offices, estimated to comprise about 54% of access lines in the U.S. in 1988, as well as 2/2B ESSs and 3ESSs. The ESSs provide valuable features and services now, and are not yet generally ready for replacement.

In addition is the base of electromechanical offices which are generally more suitable candidates for replacement by digital switching equipment.

These electromechanical and analog SPC switches are currently not capable of providing ISDN access or services.

Thus, heretofore implemented systems that provide ISDN capabilities on existing switches, be they electromechanical, analog, or even digital switches that do not have ISDN capability, generally requires either total switch replacement, or a non-integrated approach where an ISDN switch is co-located with the existing switch. The non-integrated approach results in the addition of a new switch, separate and distinct from the existing one.

In this "traditional" approach, the ISDN switch provides ISDN interfaces on the customer premises side, and analog line interfaces (such as analog loop-start or ground-start lines) as the interface to the existing switch for voice calls that enter the ISDN switch, while circuit-switched and packet data are switched directly in and out of the ISDN switch.

Several drawbacks or limitations to the heretofore implemented systems in providing ISDN capability are:
(a) One B-channel has to be dedicated for voice, and one B-channel for circuit switched or packet data on an ISDN BRI. This results in significantly less efficient port utilization on the ISDN BRI B-channels since efficiency mandates an exactly 50 percent split between those B-channels used for voice, and those that are used for data.
(b) Separate telephone directory number (DNs) have to be used for voice and for data calls, the voice DN being a subset of the DNs of the existing analog switch, and the data DNs being part of the DNs of the ISDN switch.

This "traditional" approach for providing ISDN results in there being two separate switching entities, with very little interworking between them, i.e., a non-integrated approach.

SUMMARY OF THE INVENTION

The present invention relates to apparatus and a method for providing existing telephone switching equipment, that normally connects a calling subscriber to a remote subscriber on either the same switch, or a different interconnected switch, with the capability of controlling the connection, management, utilization for information transfer, and disconnection of telephone circuits used for terminals (voice telephone sets, data terminals, personal computers, special terminal equipment, or other computer-based intelligent devices) that access the switching equipment by means of Integrated Services Digital Network (ISDN) interface protocols.

For implementation of inter-office ISDN calls, or ISDN services across multiple telephone central office switches, it is required that the existing analog or digital switch possesses the capability of Signaling System No. 7 (SS7), which is an international and national (U.S.) standard protocol for signaling between central office (CO) switches.

Apparatus and a method for providing existing telephone switching equipment with the capability of controlling the connection, management and disconnection of incoming and outgoing telephone circuits on SS7 trunk circuits using the SS7 protocol is described in a co-pending patent application entitled "APPARATUS AND A METHOD FOR PROVIDING EXISTING TELEPHONE SWITCHING EQUIPMENT WITH THE CAPABILITY OF USING THE SS7 PROTOCOL", filed Apr. 27, 1988, Ser. No. 186,610.

The apparatus includes a line-side interface coupled between a plurality of ISDN voice or data terminals and the existing switching system for providing appropriate protocols to the ISDN terminal and the switching system and generating a switching system port-identifying signal. A receiver module is coupled to the output of the existing switch matrix for receiving the dialed called number digits for voice calls and identifying port signal, and generating a first signal identifying the specific call and the type of trunk circuit required for SS7 calls or non-SS7 calls. The receiver module also generates a second signal representing the called number for the specific call. The apparatus further includes means for coupling the first signal from the receiver module to the switching system for routing the calling subscriber to an identified type of trunk circuit. The apparatus further includes a digital switch module for coupling the circuit switched data calls from the line-side interface to an SS7 trunk interface circuit and coupling packet switched data from the line-side interface to packet networks. Further, for inter-office voice calls using SS7 signaling, the trunk circuit interface is coupled to predetermined ones of SS7 trunk circuits and the existing switching system for receiving the first signal generated by a receiver module and generating an identification signal for a selected trunk circuit which is related to a specific call and coupling the calling line to the selected SS7 trunk circuit in accordance with the receiver module first signal for transmission to the receiving subscriber. For inter-office circuit switched data calls using SS7, the trunk circuit interface is coupled to predetermined ones of SS7 trunk circuits and the digital switch module. A processor means is coupled to the line-side interface and a subscriber line interface for providing line and port correlation, digit translation and interfacing to the receiver module for the voice calls and receiving the signal representing the calling subscriber port for the specific call and generating the calling number for the specific call, to the receiver module for receiving the second signal representing the called number for the specific call, and to the trunk circuit interface for receiving the trunk circuit identification signal for the specific call and transmitting the calling number, the called number, and the trunk circuit identification on the SS7 link to the receiving subscriber switching equipment. The processor means is coupled to the line-side interface, the digital switch module and the trunk circuit interface for providing the line and trunk correlation, digit translation and transmitting the calling number, the called number and trunk circuit identification on the SS7 link to the receiving subscriber switching equipment for data calls.

BRIEF DESCRIPTION OF THE DRAWINGS

For a more complete understanding of the present invention and the advantages thereof, reference may be made to the /following description taken in conjunction with the accompanying drawings in which.

DETAILED DESCRIPTION OF THE DRAWINGS

Standard Class 5 central telephone offices and access tandems in general, such as the 1ESS, 1AESS and the No. 5 Crossbar do not possess ISDN, or SS7 capability.

Figure 1:
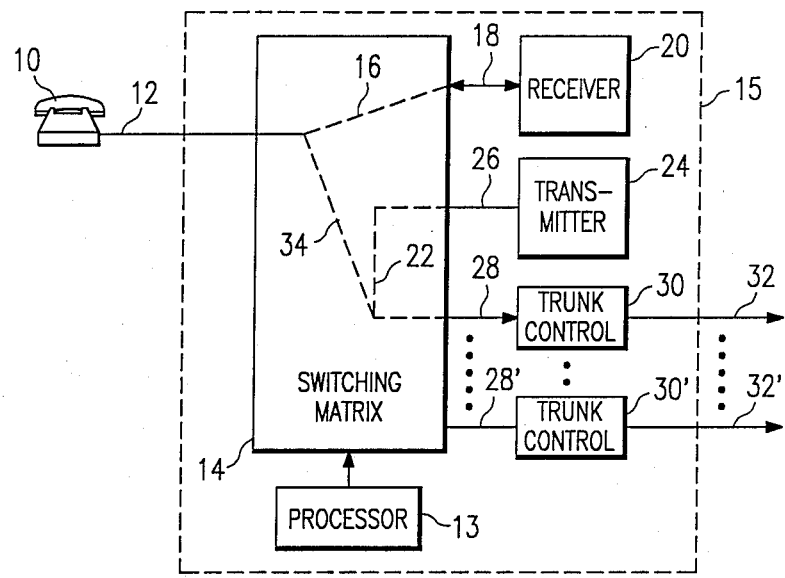
FIG. 1 is a block diagram representing the prior art non-ISDN and non-SS7 telephone switching devices having a switching system for coupling a calling subscriber to a trunk circuit or for coupling a received signal on a trunk circuit to a called subscriber.

FIG. 1 discloses such a typical prior art non-ISDN/non-SS7 switching system. The subscriber telephone 10 generates a status signal such as, for instance, on-hook and off-hook signals, as well as dialed number digits, and the conversation message on line 12 to the switching system 15 in general and to switching matrix 14, in particular. The off-hook signal and the called number dialing digits are connected, in a well known manner, through switch 16 in switching matrix 14 on line 18 to a switching system receiver 20 which collects the digits as dialed by the subscriber and provides the line supervision. The digits collected in receiver 20 are analyzed by a processor 13 in the switching system 15 which then determines the outgoing route and trunk circuit. The processor 13 in the switching system 15 then closes switch contacts 22 to couple a transmitter 24 through line 26 to an appropriate one of a plurality of lines 28—28' and trunk control circuits 30—30' to transmit the called number on trunk circuits 32—32' to the remote receiving switching office. After the dialed number is transmitted on the appropriate one of trunk circuits 32—32', the processor 13 opens switch connection 22 thus disconnecting transmitter 24 and coupling switch connection 34 to the input subscriber line 12 so that the subscriber can communicate through telephone terminal 10 to the number dialed.

One of the major disadvantages of this system is that the called number must be determined and a connection made between the transmitter 24 and the trunk circuit 32. The called number is then transmitted on the trunk circuit 32 and, next, the circuit to the transmitter is disconnected and the circuit completed between the telephone subscriber terminal and the output trunk circuit.

The ISDN and SS7 protocols enable more rapid and efficient control switching to occur and enable provision of other enhanced services as well. However, it is frequently not economically feasible to replace the prior art switching equipment of FIG. 1 for newer equipment embodying the ISDN and SS7 protocols. To upgrade the existing switching systems as shown in FIG. 1 to accept the ISDN and SS7 protocols requires not only that all of the requirements of the ISDN and SS7 protocols be followed, but also that the existing switching circuit functions not be disturbed. They must be allowed to operate in their usual fashion when needed.

Figure 2:
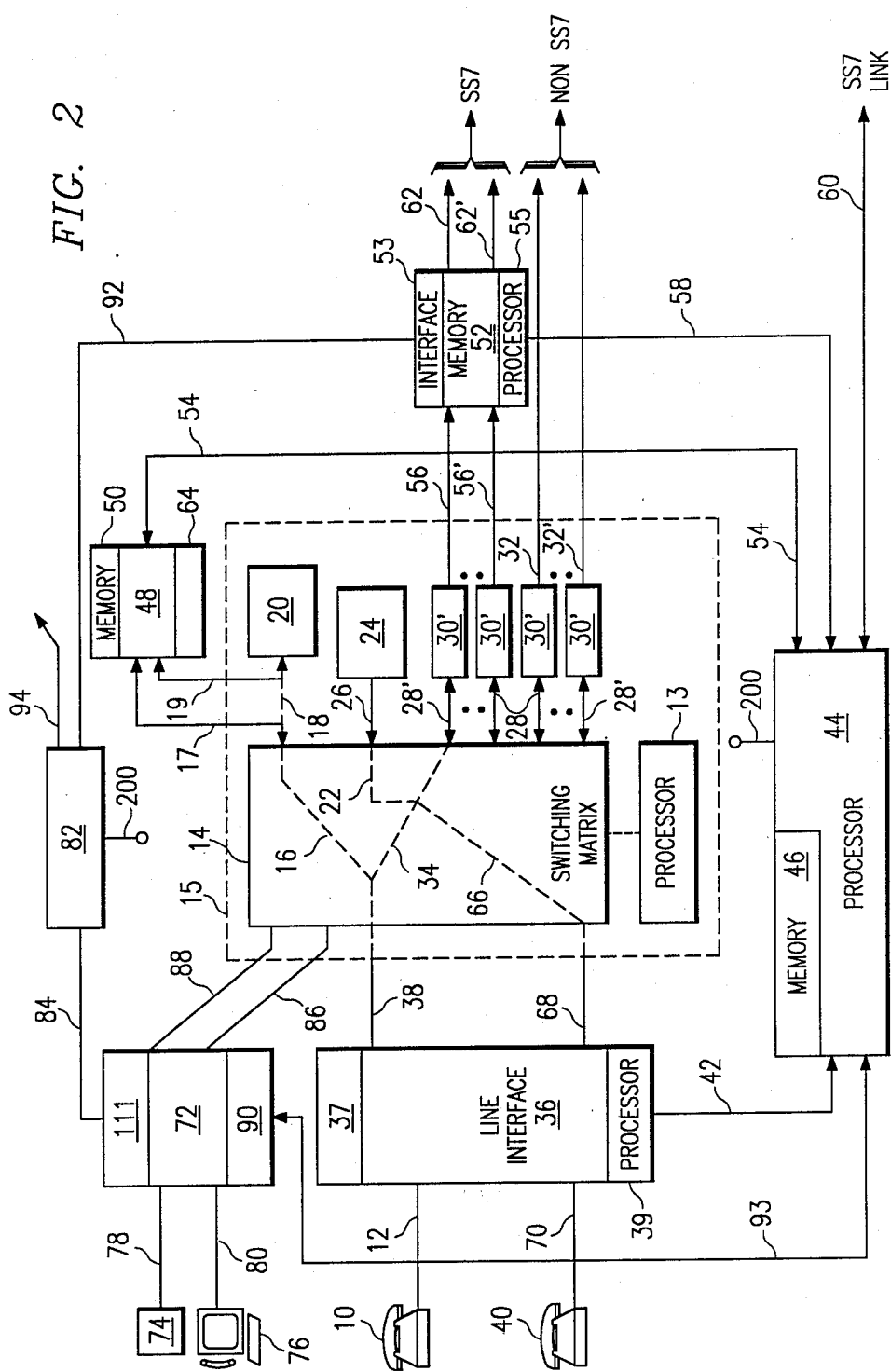
FIG. 2 is a diagrammatic representation of the apparatus of the present invention used in conjunction with the existing switching system of FIG. 1 to upgrade it with the capability of controlling the connection, management and disconnection of incoming and outgoing telephone circuits using the ISDN interface protocol and SS7 protocol.

FIG. 2 illustrates the prior art switching system of FIG. 1 designated by the numeral 15 to which has been added equipment necessary to upgrade the system to accommodate the ISDN protocol and the SS7 protocol without disturbing the operation of the prior art system 15. This added equipment also avoids replication of existing features and functions of the switch of FIG. 1 and provides an integrated systems approach with no separation of Directory Numbers (DNs) for voice and data, nor any re-trunking required. Like numerals used in FIG. 2 designate like elements in FIG. 1. It will be noted that the only change to the prior art switching system 15 in FIG. 2 is that the connection 18 between the switching matrix 14 and customer dial pulse receiver 20 is broken and a receiver module 48 is interposed between those two units using connections 17 and 19.

Describing first the operation of the switching system of FIG. 2 with the SS7 protocol, an off-hook status occurs on line 12 as a result of the subscriber 10 going off-hook (or equivalent equipment action such as a PABX seizure). This off-hook status is coupled to a subscriber line interface 36 that is interposed between the calling subscriber telephone 10 and the switching matrix 14 in switching system 15. It will be understood, of course, that a plurality of subscribers, as represented by additional telephone 40, may also be coupled to the subscriber line interface 36. Subscriber line interface 36 includes a memory 37 for storing necessary information and a processor 39 for controlling information received and stored. In addition, subscriber line interface 36 contains a ringing signal detector circuit and an on-hook/off-hook detector circuit.

Subscriber line interface 36 generates a signature tone for the call, the identity of which, along with the line number (line 12) and the status change to off-hook, is coupled on line 42 to processor 44 which has memory 46 for storing this data in relation to this specific call. A particular number is identified by processor 44 as the calling number of subscriber 10 and is associated in its memory 46 with the stored signature tone identity, line number and line status as described above.

The switching system 15 performs its normal function of coupling the line 12 via matrix 14 using switching circuit 16 to the switching system receiver 20. The receiver module 48 is interposed between the matrix 14 and the switching system receiver 20 and provides appropriate status and signaling toward both the switching matrix 14 and the switching system receiver 20 so that the switching system 15 is not affected by the interposition of receiver module 48.

The signature tone, generated by subscriber line interface 36, is coupled through the switching system matrix 14 to the receiver module 48. The receiver module 48 returns dial tone to the subscriber 10.

The signature tone identity is then transmitted by receiver module 48 through line 54 to the processor 44 requesting calling line information. The processor 44 responds with the calling line information associated with the signature tone as it has determined from information stored in its memory 46. This information is stored in the receiver module memory 50.

When the subscriber dials the called number digits, they are coupled to the receiver module 48. From these called number digits, the receiver module 48 searches its memory 50 to determine the call destination, such as an SS7 trunk or a non-SS7 trunk or an intra-office call circuit, and calling number information along with any additional information pertinent to the called number such as area code and the like.

If the receiver module 48 determines the call destination is to an SS7 trunk, the receiver module 48 generates a first signal identifying the specific call and the type of trunk circuit required. This first signal is typically a 7 or 10 digit number of the format normally used by the switching system 15 in routing calls to trunk circuits. This first signal is a pseudo office code which the receiver module 48 sends to the switching system receiver 20 in switching system 15 in the form of a specific digit string that, when analyzed by switching system processor 13, will cause a specific matrix switch 34 in switching matrix 14 to connect to the desired trunk circuit 56 through trunk control circuit 30.

The receiver module 48 generates a second signal related to the specific call consisting of the called number and the first signal or pseudo code. This second signal is coupled to processor 44 via line 54 and is stored in memory 46 associated with the specific call.

The switching system 15 using switching matrix 14, switch 22, transmitter 24 and trunk control circuit 30' will send the first signal or pseudo code via a selected switching system trunk circuit 56 to trunk circuit interface 52 using the normal switching system process for a trunk call. Interface 52 also has a memory 53 for storing necessary information and a processor 55 for controlling information received and stored.

The trunk circuit interface 52 couples the selected switching system trunk circuit 56 to the SS7 network trunk circuit 62. The trunk circuit interface 52 then sends the pseudo code received and the identification of the SS7 network trunk circuit 62 to processor 44 via line 58. The processor 44 associates this information via the pseudo code to the specific call information in memory 46.

The processor 44 now has the signals necessary for transmitting the SS7 protocol information on the separate SS7 link 60 to the call receiving switching office.

Thus, while the subscriber station 10 is now coupled through the switching matrix 14 via switch 34, appropriate switching system trunk circuit 56, trunk interface circuit 52 and through network trunk circuit 62 to the receiving switching office, the processor 44 is simultaneously transmitting the calling number, the called number, the trunk circuit identification and other appropriate information required for SS7 protocol on SS7 link 60 to the receiving switching office for connecting and managing the call when it is received at the receiving switching office.

The memory 50 in receiver module 48 also stores information relating the called number digits to a destination. A translator or comparator 64 in the receiver module 48 compares the dialed digits with the stored information to generate the routing signal identifying the type of destination required for the dialed digits such as an intra-office call or the type of trunk line (SS7 or non-SS7). Thus, if the signal generated indicates that the dialed digits are to be routed to an intra-office called number, the appropriate switch in switching matrix 14 is actuated. For instance, switch 66 may be actuated to couple switch path 34 to line 68, through subscriber interface 36, and line 70 to telephone subscriber 40.

If, when analyzing the subscriber dialed digits, the receiver module 48 determines that the call destination is an intra-office call requiring special features such as selective call rejection for the destination based on the calling line information, the receiver module 48, from its data in memory 50 or via access of processor 44 memory information on line 54, can reject the call or forward the call to a different destination via appropriate digits sent to the switching system receiver 20.

At the receiving switching office, the same system shown in FIG. 2 works in reverse for SS7 calls. Thus, processor 44 receives on SS7 link 60, a network trunk circuit 62 identification, the calling number, the called number and other appropriate information per SS7 protocol from the remote switching office. If, when analyzing the called number, the processor 44 determines from its memory 46 that the called subscriber has gone off-hook, or is being provided a ringing signal by the switching system 15, then it can reject the call by normal SS7 protocol or forward the call using information from memory 46 to a different destination by modifying the called number appropriately.

If the call has not been rejected, the called or the modified called number and trunk circuit identification received by processor 44 on SS7 link 60 are coupled on line 58 to the trunk circuit interface 52. The trunk circuit interface 52 sends the called number via existing trunk circuit protocol to the appropriate switching system trunk circuit 56. The trunk circuit interface 52 utilizes the trunk circuit identification to couple the SS7 network trunk circuit 62 to the appropriate switching system trunk circuit 56. The switching system 15 processes the call in the normal fashion coupling the switching system trunk circuit 56 to the called subscriber 10. Thus, the subscriber line 12 is now connected through the appropriate port in subscriber line interface 36 to the appropriate switch circuit 34 in switching matrix 14.

Continuing with reference to FIG. 2, in addition to providing upgrading of the prior art switching system of FIG. 1 with SS7 protocol capability, this prior art switching system is also provided with an Integrated Services Digital Network (ISDN) interface protocol capability. ISDN provides an end-to-end digital network offering a wide range of services accessed by a limited set of standard multi-purpose user-network interfaces. The enhanced system as shown in FIG. 2 provides ISDN protocol capability for both intra-office calls and between Central Office switching systems by use of the SS7 protocol. A digital line-side interface 72 is interposed between a plurality of ISDN terminals 74 and 76 and the switching matrix 14 of the switching system 15. Typically, the ISDN terminals 74 comprise PABX and computer equipment, and the ISDN terminals 76 comprise voice telephone sets, data terminals, personal computers, special terminal equipment, or other computer-based intelligent devices. It will be understood, of course, that a plurality of terminals, as represented by the terminals 74 and 76, may be coupled to the line-side interface 72. Interconnecting the line-side interface 72 to the terminals 74 and 76 are ISDN basic rate interface (BRI) lines 80 and primary rate interface (PRI) lines 78.

Also coupled to the line-side interface 72 is a digital switch module 82 that switches data calls to and from the line-side interface 72 via a plurality of data channels which are multiplexed in lines 84, and by means of data channels multiplexed in lines 92 to and from the trunk circuit interface 52 as previously described with reference to the capability for the system for SS7 protocol operation. In addition, calls may be routed through the digital switch module 82 directly via multiplexed lines 94 to a packet-switched network for packet data, or, as explained, via the trunk circuit interface 52 for inter-office circuit switched data. Module 82 is coupled on line 200 to processor 44 to provide exchange of control information.

The line-side interface 72 also connects to the switching matrix 14 of the switching system 15 via a plurality of B-channel primary analog lines 86, equal in number to the number of ISDN basic rate interface lines 80, plus an appropriate multiple of the number of ISDN primary rate interface lines 78 coupled to the user side of the line-side interface 72. Thus, there is one analog line 86 to the switching matrix 14 for each ISDN BRI line and this line 86 is termed the "primary analog channel". To avoid increased terminations to the switching matrix 14 for additional voice traffic, a plurality of pooled analog lines 88 provides a line pool from the line-side interface 72 to the switching matrix 14.

In operation, a primary analog line 86 is selected for setting up the first voice call from one of the basic rate interface lines 80. When a second voice call is initiated on a BRI line 80 when the primary analog line 86 already has an active voice call, one of the plurality of "pooled" analog lines 88 is selected for establishing the call interconnection. A line from the pool is thus only used when the primary analog line associated with an ISDN BRI line is already being used and a second voice call is originated or terminated on that BRI line. Hence, the pooled analog lines 88 provide flexibility while not increasing the cost of the ISDN protocol capability on the switching system 15.

Additional modifications to the system of FIG. 2 as described with reference to the SS7 protocol are required for the ISDN protocol. In particular in the processor 44, the memory 46 is reconfigured to provide line and trunk port correlation, digit translation and interfacing through the line 54 to the receiver module 48. The functions of the receiver module 48 for the ISDN protocol are the same as previously described with reference to the SS7 protocol.

With reference to the operation of the line-side interface 72, this interface detects the status condition of any of the ISDN subscriber terminals 74 or 76 and in response to an "off-hook" status couples the dialed called number digits to the receiver module 48 connected to the line via switching matrix 14 of the switching system 15. Further, the line-side interface 72 generates signals identifying the subscriber port or terminal for a specific call. To perform these functions, the line-side interface 72 includes a memory 111 and a processor 90, coupled by means of a line 93 to the processor 44.

When a voice call is initiated on a basic rate interface line 80, the line-side interface 72 selects a suitable analog line 86 or 88 and sends an off-hook status to the switching matrix 14 and generates a port-identifying signal. The receiver module 48, coupled to the analog line 86 or 88 via the switching matrix 14, receives the dialed called number digits, identifies the port signal, and generates a first signal identifying the specific call type, and the type of trunk circuit required, for example, an SS7 trunk circuit for inter-office calls. Basically, the line-side interface 72 also provides the same functions as provided by the subscriber line interface 36 to identify the line by a "signature tone" signal as previously described.

With reference to the data lines 84 coupling the line-side interface 72 to the digital switch module 82, these lines transmit circuit-switched data calls which are to be routed to the network or for packet data calls that are to be routed to an external packet handler or to other packet networks.

Thus, the line-side interface 72 processes signaling messages sent by the ISDN terminals 74 or the ISDN terminals 76. When an ISDN terminal originates an outgoing call by sending appropriate ISDN signaling to the line-side interface 72, the interface determines the route of the call, whether the call is intra-office or inter-office, whether the call is a voice or data call, and whether the called number for an intra-office condition is to another ISDN terminal or a non-ISDN terminal. More specifically, if the outgoing call is a voice call to a non-ISDN line from the switching system 15, the line-side interface 72 seizes one of the primary analog lines 86 to the switching matrix 14, if available, or one of the pooled analog lines 88, and provides an off-hook status signal on the selected line to the switching matrix 14. The call is then processed as previously described with reference to the SS7 protocol operation. That is, with the exception that the line-side interface 72 provides the called number, which was previously received on one of the ISDN lines 80, through the processor 44 to the receiver module 48. Otherwise, the call set up proceeds as previously described. The called line status being monitored by the subscriber line 36 is relayed through the processor 44 to the line-side interface 72 which converts this information to the appropriate ISDN signaling to couple the appropriate ISDN line from one of the terminals 74 or 76 to one of the analog lines 86 or 88 connected to the switching matrix 14.

If the outgoing call is a voice call to an ISDN line from the switching system 15, the procedure and operation of the system of FIG. 2 is similar to the processing of a voice call to a non-ISDN line with the exception that any additional ISDN signaling information between the ISDN lines 80 is directly passed by the line-side interface 72 without involving the switch matrix 14. Thus, voice calls from the terminals 74 for both non-ISDN lines and ISDN lines are similar except for the passing of the ISDN signaling information.

A third call processing condition is when the outgoing call is a voice call destined for an SS7 trunk circuit. In this situation, the call proceeds as previously described with reference to the SS7 protocol operation with the exception that the line-side interface 72 provides the called number, which it again has received from one of the ISDN lines 78 or 80, through the processor 44 to the receiver module 48. Any additional information received by the line-side interface 72 is transmitted to the processor 44 via the line 93 wherein it is formatted and the information transmitted to the receiving switching office over the SS7 link 60.

A fourth possible scenario is when a voice call from a terminal 74 is to a non-SS7 trunk. Again, the call set-up proceeds as described earlier with reference to the SS7 protocol, with the exception that the line-side interface 72 provides the called number, which it again has received from one of the ISDN lines 78, through the processor 44 to the receiver module 48.

In addition to switching voice calls, the ISDN protocol also supports data calls through the system as shown in FIG. 2. If the outgoing call is a data call to another ISDN line, the line-side interface 72 sets up the data connection between the calling ISDN line and the called ISDN line via an internal switching matrix. Processing of a data call to another ISDN line does not involve the use of the switching system 15. Instead, the line-side interface 72 provides the appropriate signaling to the ISDN lines, both the calling and called lines involved in the connection.

A second condition for switching data calls involves an inter-office circuit. When the outgoing call is an inter-office data call, the line-side interface 72 establishes a connection via the line 84 to the digital switch module 82. The digital switch module 82 then establishes a connection to the trunk circuit interface 52. Further, the line-side interface 72 provides information via the line 93 to the processor 44, the information including that the connection has been made, the calling and called numbers, and other information. By operation of the trunk circuit interface 52, the digital switch module 82 is connected by means of a line 92 to one of the SS7 digital trunk circuits 62. In addition, the trunk circuit interface 52 provides connection information to the processor 44.

With the information received from the line-side interface 72 and the trunk circuit interface 52, the processor 44 transmits the SS7 protocol information on the SS7 link 60 to the called receiving switching office. This operation is similar to that described previously in a detailed description of the SS7 protocol. With the SS7 call established, the processor 44 now relays protocol information related to the call between the line-side interface 72 and the network via the SS7 protocol.

Still another possibility is that the outgoing call is a packet-switched data call on either the ISDN B-channel or the ISDN D-channel. In this situation, the line-side interface 72 processes the protocol information internally by means of an internal packet handler, or routes the data through the digital switch module 82 to an external packet handler (not shown) by means of the line 94.

In addition to functioning as an outgoing switching office, the system of FIG. 2 also functions as a receiving office for incoming calls both voice and data. When an intra-office voice call is made to one of the ISDN lines 78 or 80, the call is initially received at the receiver module 48. The receiver module 48 determines the status of the primary analog line 86 of the called ISDN line by means of information received from the processor 44. If the primary analog line 86 is busy because of another voice call, the receiver module 48 provides the analog line number of one of the pooled analog lines 88 to the switching system receiver 20 thereby setting up the switching system 15 to route the call to the identified pooled analog line 88. The line-side interface 72 functions to couple the selected analog line, either a primary line 86 or a pooled line 88, to the appropriate B-channel on the ISDN line and sends the appropriate signaling on this line.

For an SS7 protocol call, the signaling information is received and arrives at the processor 44 over the SS7 link 60. Initially, the processor 44 functions to evaluate and determine whether the call is a voice call or a data call. If the incoming call is a data call to an ISDN terminal 76, the processor 44 sets up a digital connection for the call between the trunk circuit interface 52, and the line-side interface 72 via the digital switch module 82. The relevant call information is then passed to the line-side interface 72 which sends the appropriate signaling information to the identified ISDN terminal 76.

When the incoming call is a voice call to an ISDN terminal 76 utilizing the SS7 protocol, the processor 44 again receives the signaling information over the SS7 link 60 and determines the status of the primary analog line 86 for the identified ISDN terminal 76 and determines if this line is in a busy state. If the identified line is busy, then the processor 44 identifies a number of one of the pooled analog lines 88 to the line-side interface 72. If the primary analog line 86 is not busy, then this information is passed to the trunk circuit interface 52. Identification of either the primary analog line 86 or one of the pooled analog lines 88 to the trunk circuit interface 52 then sets up the required interconnection through the switching matrix 14 to complete the call to the ISDN terminal 76. In addition, the processor 44 also passes to the line-side interface 72 that an incoming call has been established and this interface then provides appropriate signaling on the ISDN line and couples either the primary analog line or the pooled analog line to the selected B-channel of the ISDN line 80.

Figure 3:
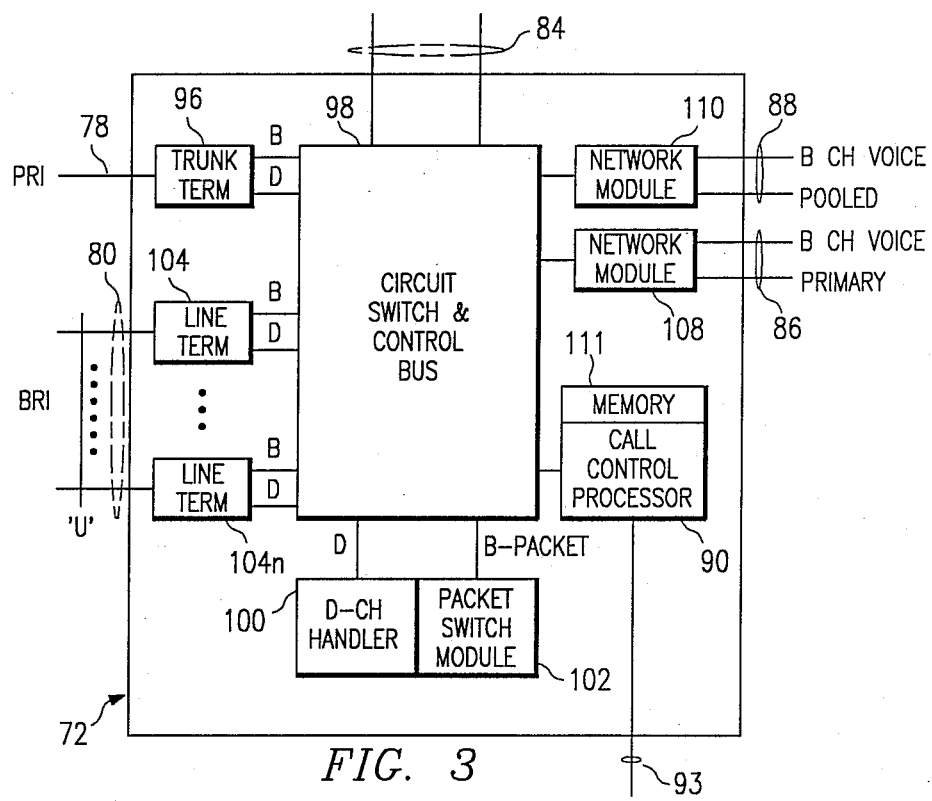
FIG. 3 a diagrammatic representation of the line-side interface for the apparatus of the present invention as illustrated in FIG. 2.

Referring to FIG. 3, there is shown the system architecture for the line-side interface 72 including line and trunk terminations to interconnect the interface to the basic rate interfaces (ISDN lines 80) and the primary rate interfaces (ISDN lines 78). The line-side interface 72 consists of a number of rack-mounted, intelligent devices inserted between BRI-ISDN lines 78 and the BRI-ISDN lines 80 and the primary analog lines 86 and the pooled analog lines 88. This interface provides ISDN basic rate and primary rate access interfaces to the switching system 15. In addition, the line-side interface 72 is a generic platform that provides an interface for digital standard and proprietary terminals to uniformly interface to the switching system 15.

Referring to the BRI-ISDN lines 80, information on these lines is coupled to the circuit switch and control bus 98 through one of the line terminations 104 through 104n. Both B and D-channel information are routed through the line terminations 104. The B-channels and the D-channels on the PRI-ISDN lines 78 are routed through a trunk termination network 96 to the circuit switch and control bus 98. The D-channels of the ISDN lines 78 and 80 are routed via the circuit switch bus 98 to a D-channel handler 100. The D-channel handler 100 performs link layer processing As an option, data calls on the D-channels are routed through the switch and control bus 98 to a packet-switch module 102. The packet-switch module 102 provides the packet processing for D-channel packet data and also for B-channel packet data transmitted through the circuit switch bus 98.

In the process of completing a call on the PRI-ISDN lines 78 or the BRI-ISDN lines 80, the circuit switch and control bus 98 sets up a voice connection to the primary analog lines 86 through a network module 108 and alternatively sets up a voice connection to the pooled analog lines 88 through a network module 110. To process the call set-up information the line-side interface 72 includes a memory 111 and the call processor 90 connected to the circuit switch and bus control 98 and the call processor 44 by means of line 93. To establish various data call interconnections between the ISDN lines and the trunk interface circuit 52, the circuit switch and control bus 98 is interconnected to the digital control module 82 by means of the lines 84.

Functionally, the line-side interface 72 as illustrated in FIG. 3 operates as previously described with reference to the detailed description of FIG. 2.

The upgraded circuit shown in FIG. 2 will allow the existing switching system to function as it normally functions with SS7 trunk lines and non-SS7 trunk lines, but will also allow the system to be operated using the ISDN protocol as necessary. Thus, the underlying principles of the existing switching office are not affected. In addition, the ISDN capability is provided as disclosed herein in a cost effective manner and without adversely affecting the quality of service as perceived by the subscribers connected to the switching office.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

We claim:

1. Apparatus for upgrading existing telephone switching equipment for connecting a calling subscriber to a remote receiving subscriber through a switching system having a switching matrix, SS7 trunk circuits and non-SS7 trunk circuits, with the capability of controlling the connection, management and disconnection of incoming and outgoing calls to or from ISDN terminals using an ISDN protocol comprising:

a line-side interface coupled between a plurality of subscriber ISDN terminals and the switching system for detecting a status condition of any ISDN terminal, generating a signal identifying the subscriber port for a specific terminal, and coupling said port-identifying signal to the switching system;

a receiver module coupled to the switching system for receiving the port-identifying signal, and the corresponding dialed called number from the line-side interface, generating a first signal identifying the specific call and the type of trunk circuit required as SS7 or non-SS7, and generating a second signal representing the called number associated with the specific call, said first signal being coupled to said switching matrix for routing the calling subscriber terminal to the identified trunk circuit;

a trunk circuit interface coupled to predetermined ones of said SS7 trunk circuits and to said switching system for receiving said first signal generated by the receiver module and generating a trunk circuit identification signal related to the specific call, said trunk circuit interface coupling the calling ISDN terminal to the selected SS7 trunk circuit in accordance with the first signal of said receiver module for transmission of a terminal message to the receiving terminal; and processor means coupled to said line-side interface for receiving the signal representing the subscriber port associated with said specific call, and generating the calling number for said specific call and for receiving from the line-side interface the signal representing the called number associated with the specific call, said processor means also coupled to said receiver module and to said trunk circuit interface for receiving said trunk identification signal for said specific call and transmitting said calling number, said called number, and said trunk circuit identification signal on the SS7 link to the receiving terminal.

2. Apparatus for upgrading existing telephone switching equipment as set forth in claim 1 further comprising:

a digital switch module coupled to said line-side interface and said trunk circuit interface to switch data calls to and from the line-side interface and to and from the trunk circuit interface in the ISDN protocol.

3. Apparatus for upgrading existing telephone switching equipment as set forth in claim 1 wherein said processor means provides line and trunk port correlation, and digit translation for interfacing to said trunk circuit interface.

4. Apparatus for grading existing telephone switching equipment as set forth in claim 1 further comprising:

a plurality of primary analog lines interconnected between said line-side interface and said switching matrix;

a plurality of pooled analog lines interconnected between said line-side interface and said switching matrix; and said line-side interface including means for selecting one of said plurality of primary analog lines for setting up the first voice call to said switching means or alternatively selecting one of the plurality of said pooled analog lines for a second voice call initiated on the same basic rate interface as the first voice call.

5. Apparatus for upgrading existing telephone switching equipment as set forth in claim 1 wherein said line-side interface establishes the route of a call from a calling ISDN terminal to an intra-office destination or an inter-office destination, and further identifying if the called number to an intra-office line is another ISDN terminal or a non-ISDN terminal.

6. Apparatus for upgrading existing telephone switching equipment as set forth in claim 5 wherein said line-side interface identifies a call as a voice call or a data call.

7. A method of providing existing telephone switching equipment for connecting a calling terminal to a remote receiving terminal through a switching system having a switching matrix, SS7 trunk circuits, and non-SS7 trunk circuits, with the capability of controlling the connection, management and disconnection of incoming and outgoing terminal calls using the ISDN protocol comprising:

coupling a line-side interface between a plurality of calling ISDN terminals and the switching system for detecting a status condition of any terminal port, generating a signal identifying a terminal port for a specific call, and coupling the said generated signal to the switching system;

coupling a receiver module to the switching system for receiving the identifying port signal and receiving the corresponding dialed called number digits from the line-side interface and generating a first signal identifying the specific call and the type of trunk circuit required as SS7 or non-SS7 and generating a second signal representing the called number and the specific call;

coupling the first signal from the receiver module to the switching system for routing the calling subscriber terminal to the identified trunk circuit;

coupling a trunk circuit interface to predetermined ones of the SS7 trunk circuits and to the switching system for receiving the first signal generated by the receiver module and generating an identification signal for the selected trunk circuit which is related to the specific call and coupling the calling line to the selected SS7 trunk circuit in accordance with the receiver module first signal for transmission to the receiving subscriber; and coupling processor means to the line-side interface for receiving the dialed called number and the signal representing the calling terminal port for the specific call and generating the calling number for the specific call, coupling the dialed called number to the receiver module and for receiving the second signal representing the called number for the specific call, and further coupling the processor means to the receiver module and to the trunk circuit interface for receiving the trunk circuit identification signal for the specific call and transmitting the calling number, the called number and the trunk circuit identification signal on the SS7 link to the receiving subscriber.

* * * * *